United States Patent
Chepa (10) Patent No.: US 6,511,092 B1
(45) Date of Patent: Jan. 28, 2003

(54) EXPANDABLE UTILITY TRAILER SYSTEM

(76) Inventor: Hollis S. Chepa, 3015 Smith Rd., Borden, IN (US) 47106

( * ) Notice: Subject to any disclaimer, the term of this patent is extended or adjusted under 35 U.S.C. 154(b) by 2 days.

(21) Appl. No.: 09/847,210

(22) Filed: Apr. 30, 2001

(51) Int. Cl.[7] .......................... B62D 63/00; B62D 63/08
(52) U.S. Cl. .................. 280/656; 280/79.11; 280/408; 280/491.1; 296/50; 296/55; 414/481; 414/482
(58) Field of Search ............................... 280/656, 408, 280/511, 401, 652, 79.11, 491.1, 491.5; 296/50, 55; 414/481, 482, 537; 14/71.1, 72.5; 362/480

(56) References Cited

U.S. PATENT DOCUMENTS

| | | | | |
|---|---|---|---|---|
| 4,362,316 A | | 12/1982 | Wright | 280/656 |
| 4,662,020 A | * | 5/1987 | Wilkerson | 14/2.4 |
| 4,768,806 A | | 9/1988 | Tetreault | 280/656 |
| 4,786,073 A | * | 11/1988 | Harper | 280/491.1 |
| 5,480,180 A | * | 1/1996 | Fuller et al. | 280/491.1 |
| 5,544,944 A | * | 8/1996 | Keech | 280/482 |
| 5,560,444 A | | 10/1996 | Tiedge | 180/209 |
| 5,570,898 A | * | 11/1996 | Albert | 280/639 |
| 5,607,176 A | | 3/1997 | Leib et al. | 280/656 |
| 5,743,541 A | | 4/1998 | Cook | 280/43.13 |
| 5,936,550 A | * | 8/1999 | McCauley | 340/936 |
| 6,378,893 B1 | * | 4/2002 | Jager | 280/401 |

* cited by examiner

Primary Examiner—Brian L. Johnson
Assistant Examiner—Brian L Swenson
(74) Attorney, Agent, or Firm—Joseph N. Breaux (57) ABSTRACT

An expandable utility trailer system that included multiple trailer bed sections that are attached together to form a utility trailer of the desired size and disconnectable for storage in a small area. The expandable utility trailer system including a main trailer bed assembly, a front bed assembly, a back bed assembly; a number of side barrier sections, a brake light/turn signal circuit including a turn signal reverse operation switch, and a trailer tongue assembly.

1 Claim, 8 Drawing Sheets

FIG. 13

EXPANDABLE UTILITY TRAILER SYSTEM

TECHNICAL FIELD

The present invention relates to utility trailers and more particularly to an expandable utility trailer system that includes a main trailer bed assembly, a front bed assembly, a back bed assembly, a number of side barrier sections, a brake light/turn signal circuit including a turn signal reverse operation switch, and a trailer tongue assembly; the main trailer bed assembly including a main frame structure supported by a trailer axle having a wheel assembly at each end, a main bed member supported on the main frame structure having a front connecting edge structure adapted for pivotally connecting with the front bed assembly, a back connecting edge structure adapted for pivotally connecting with the back bed assembly and a number of spaced barrier section connecting structures on left and right main frame structure sides thereof, a tongue assembly connecting structure having a tubular forward tongue connecting structure and a tubular rear tongue connecting structure, a fender assembly for each wheel assembly that each includes a fender structure having a forward facing fender surface and a rearward facing fender surface and a user positionable brake light/turn signal lamp assembly that are attachable to either the forward facing fender surface or the rearward facing fender surface, a front bed support assembly including a pair of pivotally connected forward bed support arms that pivot from the main frame structure between a storage orientation that is parallel to the trailer axle and a support orientation that is perpendicular to the storage orientation, a back bed support assembly including a pair of pivotally connected back bed support arms that pivot from the main frame structure between a storage orientation that is parallel to the trailer axle and a support orientation that is perpendicular to the storage orientation; each bed support arm including a number of spaced barrier section connecting structures provided in connection therewith; the front and back bed assemblies being identical in construction and including a rigid bed portion having a bed portion connecting edge structure adapted for pivotally connecting with the front and the back connecting edge structures such that the front and back bed assembly may each be positioned in parallel orientation with the main bed member, in a downward angular orientation with respect to the main bed member so as to function as a ramp, and in a ninety degree vertical orientation with respect to the main bed member to provide a barrier along a front or a back edge of the main bed member; the tongue assembly including an elongated connecting bar having a trailer hitch ball connecting assembly at one connecting bar end and a main trailer bed assembly connecting bar end detachably securable in connection with the tubular forward tongue connecting structure or the tubular rear tongue connecting structure of the tongue assembly using a locking pin; each of the number of side barrier sections having a barrier structure from which parallel connection shafts protrude that are insertable into barrier section connecting structures such that the barrier structure is supported perpendicularly to the main bed member; the turn signal reverse operation switch being provided in the brake light/turn signal circuit so that the turn indicator lights operate correctly whether the tongue assembly is connected to the tubular forward tongue connecting structure or the tubular rear tongue connecting structure.

BACKGROUND ART

Many individuals could use a utility trailer from time to time but do not have the storage space for keeping the trailer out of the way when it is not being used. It would be a benefit to these individuals to have an expandable utility trailer system that included multiple trailer bed sections that could be attached together to form a utility trailer of the desired size and disconnected for storage in a small area.

GENERAL SUMMARY DISCUSSION OF INVENTION

It is thus an object of the invention to provide an expandable utility trailer system that includes a main trailer bed assembly, a front bed assembly, a back bed assembly, a number of side barrier sections, a brake light/turn signal circuit including a turn signal reverse operation switch, and a trailer tongue assembly; the main trailer bed assembly including a main frame structure supported by a trailer axle having a wheel assembly at each end, a main bed member supported on the main frame structure having a front connecting edge structure adapted for pivotally connecting with the front bed assembly, a back connecting edge structure adapted for pivotally connecting with the back bed assembly and a number of spaced barrier section connecting structures on left and right main frame structure sides thereof, a tongue assembly connecting structure having a tubular forward tongue connecting structure and a tubular rear tongue connecting structure, a fender assembly for each wheel assembly that each includes a fender structure having a forward facing fender surface and a rearward facing fender surface and a user positionable brake light/turn signal lamp assembly that are attachable to either the forward facing fender surface or the rearward facing fender surface, a front bed support assembly including a pair of pivotally connected forward bed support arms that pivot from the main frame structure between a storage orientation that is parallel to the trailer axle and a support orientation that is perpendicular to the storage orientation, a back bed support assembly including a pair of pivotally connected back bed support arms that pivot from the main frame structure between a storage orientation that is parallel to the trailer axle and a support orientation that is perpendicular to the storage orientation; each bed support arm including a number of spaced barrier section connecting structures provided in connection therewith; the front and back bed assemblies being identical in construction and including a rigid bed portion having a bed portion connecting edge structure adapted for pivotally connecting with the front and the back connecting edge structures such that the front and back bed assembly may each be positioned in parallel orientation with the main bed member, in a downward angular orientation with respect to the main bed member so as to function as a ramp, and in a ninety degree vertical orientation with respect to the main bed member to provide a barrier along a front or a back edge of the main bed member; the tongue assembly including an elongated connecting bar having a trailer hitch ball connecting assembly at one connecting bar end and a main trailer bed assembly connecting bar end detachably securable in connection with the tubular forward tongue connecting structure or the tubular rear tongue connecting structure of the tongue assembly using a locking pin; each of the number of side barrier sections having a barrier structure from which parallel connection shafts protrude that are insertable into barrier section connecting structures such that the barrier structure is supported perpendicularly to the main bed member; the turn signal reverse operation switch being provided in the brake light/turn signal circuit so that the turn indicator lights operate correctly whether the tongue assembly is connected to the tubular forward tongue connecting structure or the tubular rear tongue connecting structure.

Accordingly, an expandable utility trailer system is provided. The an expandable utility trailer system includes a main trailer bed assembly, a front bed assembly, a back bed assembly, a number of side barrier sections, a brake light/turn signal circuit including a turn signal reverse operation switch, and a trailer tongue assembly; the main trailer bed assembly including a main frame structure supported by a trailer axle having a wheel assembly at each end, a main bed member supported on the main frame structure having a front connecting edge structure adapted for pivotally connecting with the front bed assembly, a back connecting edge structure adapted for pivotally connecting with the back bed assembly and a number of spaced barrier section connecting structures on left and right main frame structure sides thereof, a tongue assembly connecting structure having a tubular forward tongue connecting structure and a tubular rear tongue connecting structure, a fender assembly for each wheel assembly that each includes a fender structure having a forward facing fender surface and a rearward facing fender surface and a user positionable brake light/turn signal lamp assembly that are attachable to either the forward facing fender surface or the rearward facing fender surface, a front bed support assembly including a pair of pivotally connected forward bed support arms that pivot from the main frame structure between a storage orientation that is parallel to the trailer axle and a support orientation that is perpendicular to the storage orientation, a back bed support assembly including a pair of pivotally connected back bed support arms that pivot from the main frame structure between a storage orientation that is parallel to the trailer axle and a support orientation that is perpendicular to the storage orientation; each bed support arm including a number of spaced barrier section connecting structures provided in connection therewith; the front and back bed assemblies being identical in construction and including a rigid bed portion having a bed portion connecting edge structure adapted for pivotally connecting with the front and the back connecting edge structures such that the front and back bed assembly may each be positioned in parallel orientation with the main bed member, in a downward angular orientation with respect to the main bed member so as to function as a ramp, and in a ninety degree vertical orientation with respect to the main bed member to provide a barrier along a front or a back edge of the main bed member; the tongue assembly including an elongated connecting bar having a trailer hitch ball connecting assembly at one connecting bar end and a main trailer bed assembly connecting bar end detachably securable in connection with the tubular forward tongue connecting structure or the tubular rear tongue connecting structure of the tongue assembly using a locking pin; each of the number of side barrier sections having a barrier structure from which parallel connection shafts protrude that are insertable into barrier section connecting structures such that the barrier structure is supported perpendicularly to the main bed member; the turn signal reverse operation switch being provided in the brake light/turn signal circuit so that the turn indicator lights operate correctly whether the tongue assembly is connected to the tubular forward tongue connecting structure or the tubular rear tongue connecting structure.

BRIEF DESCRIPTION DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
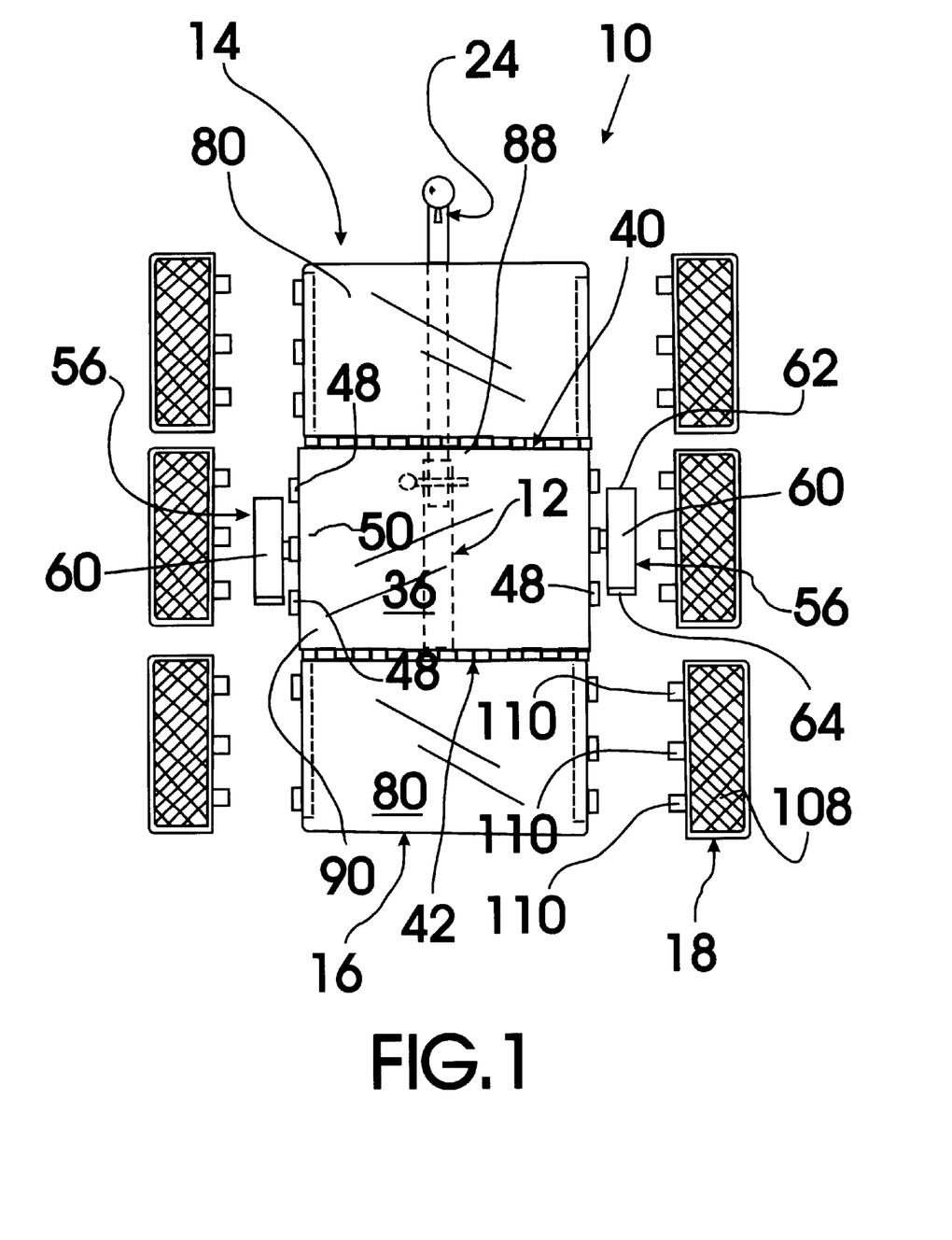
FIG. 1 is a top plan view of an exemplary embodiment of the expandable utility trailer system of the present invention.
Figure 2:
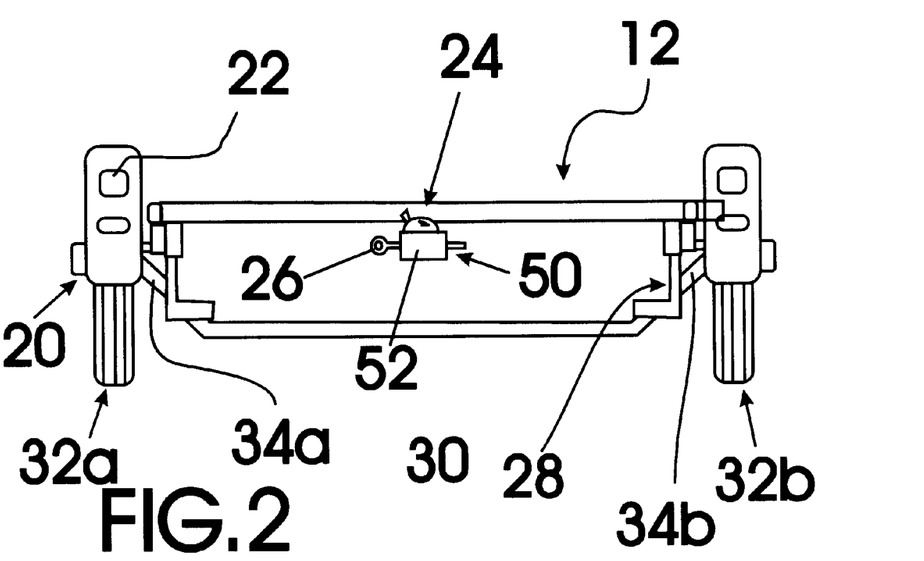
FIG. 2 is a front plan view of the expandable utility trailer system of FIG. 1 as configured in FIG. 1.
Figure 3:
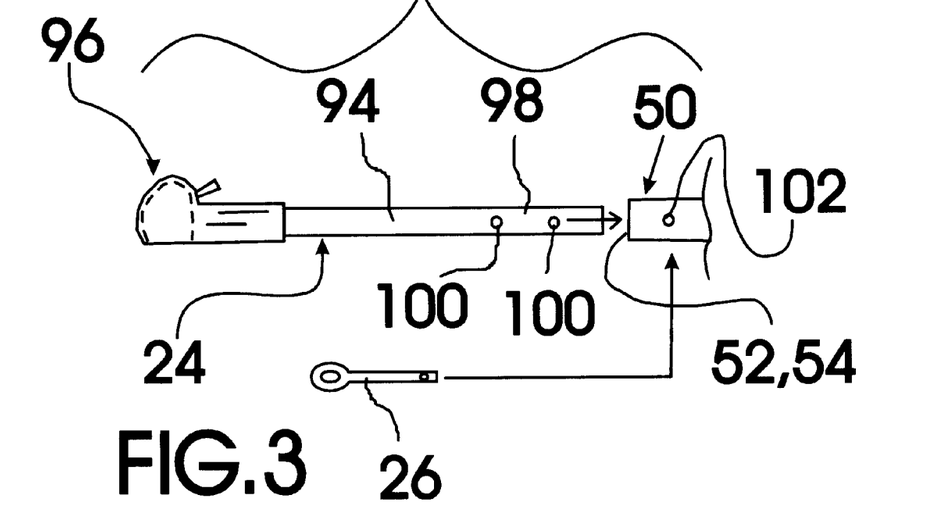
FIG. 3 is a side plan view of the trailer tongue assembly, the locking pin and one of the tubular tongue connecting structures in isolation.
Figure 4:
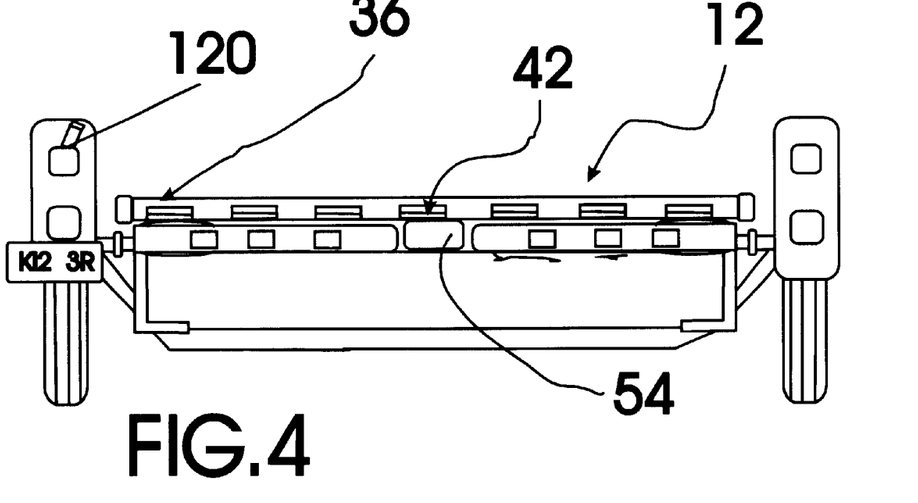
FIG. 4 is a back end view of the main trailer bed assembly of the expandable utility trailer system of FIG. 1 in isolation.
Figure 5:
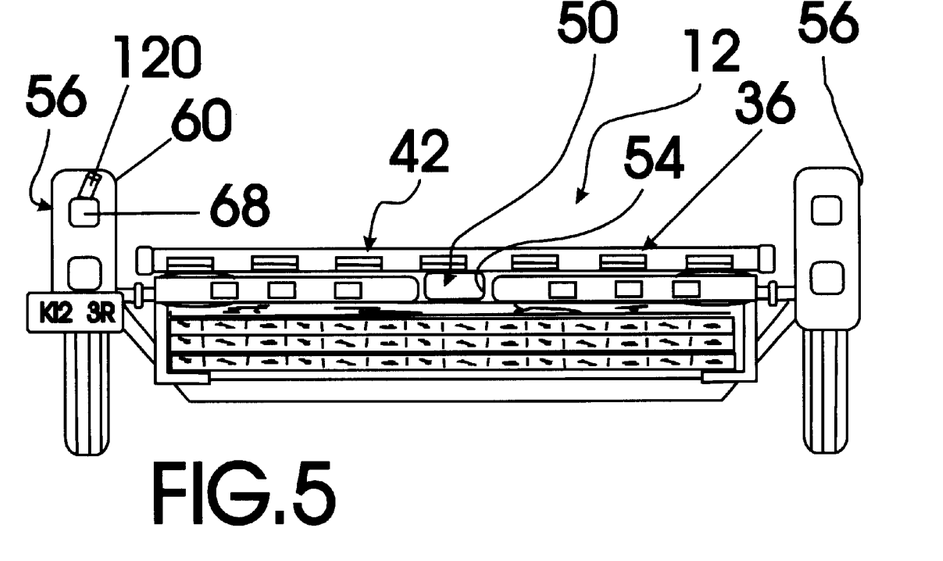
FIG. 5 is a second plan view of the main trailer bed assembly of the expandable utility trailer system of FIG. 1.
Figure 6:
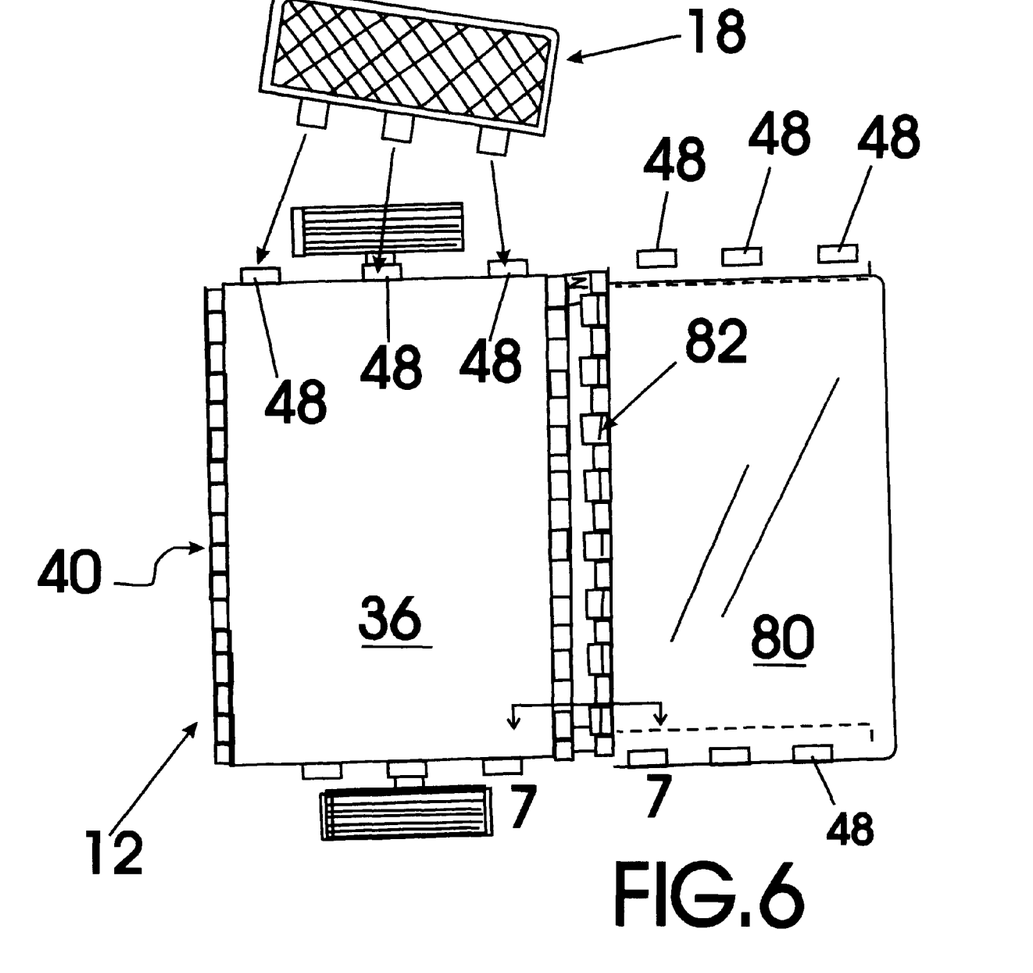
FIG. 6 is a top plan view showing the main trailer bed assembly, one of the bed assemblies, a one of the number of side barrier sections.
Figure 7:
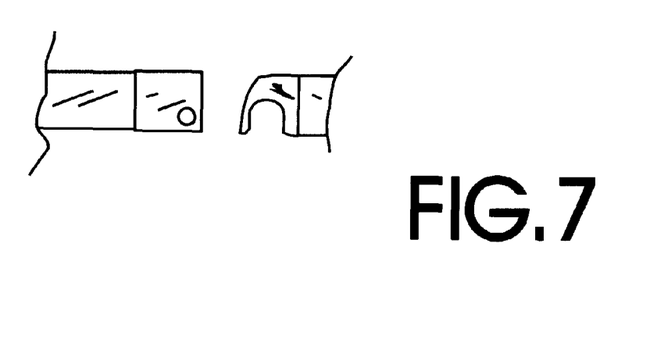
FIG. 7 is a side plan detail view showing a connecting edge structure of the main bed member including the connecting rod and one of the connecting rod support protrusions spaced apart from the rod receiving channel formed within one of the multiple rod attachment protrusions that extend from each of the rigid bed portions of the front and back bed assemblies.
Figure 8:
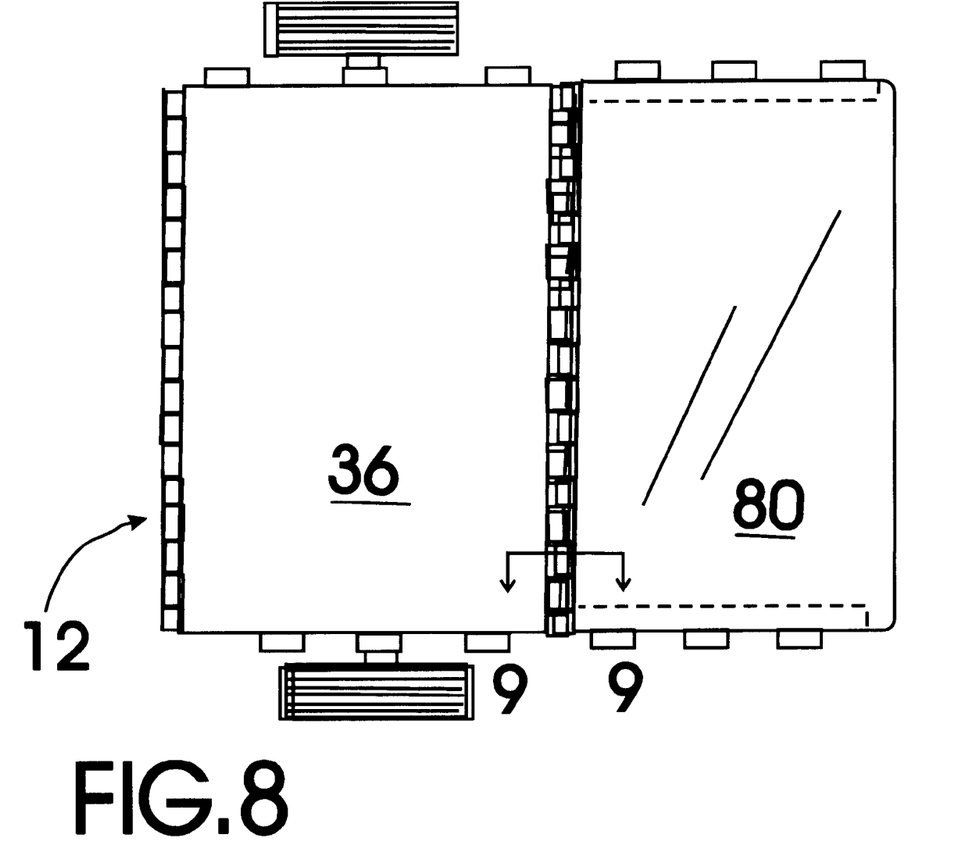
FIG. 8 is a top plan view showing the main trailer bed assembly pivotally attached to one of the bed assemblies.
Figure 9:
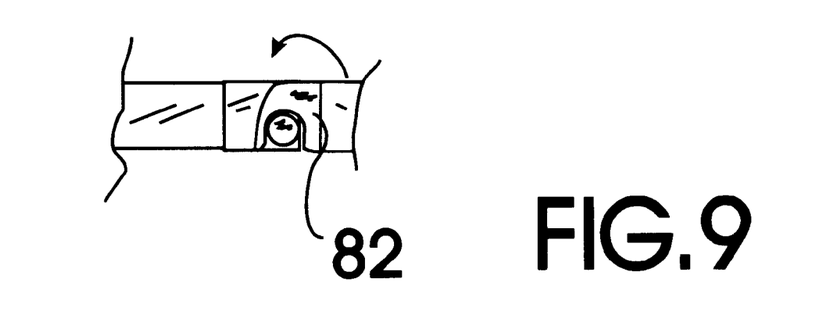
FIG. 9 is a side plan detail view showing a connecting edge structure of the main bed member including the connecting rod and one of the connecting rod support protrusions pivotally connected to one of the bed assemblies wherein sections of the connecting rod are seated within the rod receiving channels formed within the multiple rod attachment protrusions.
Figure 10:
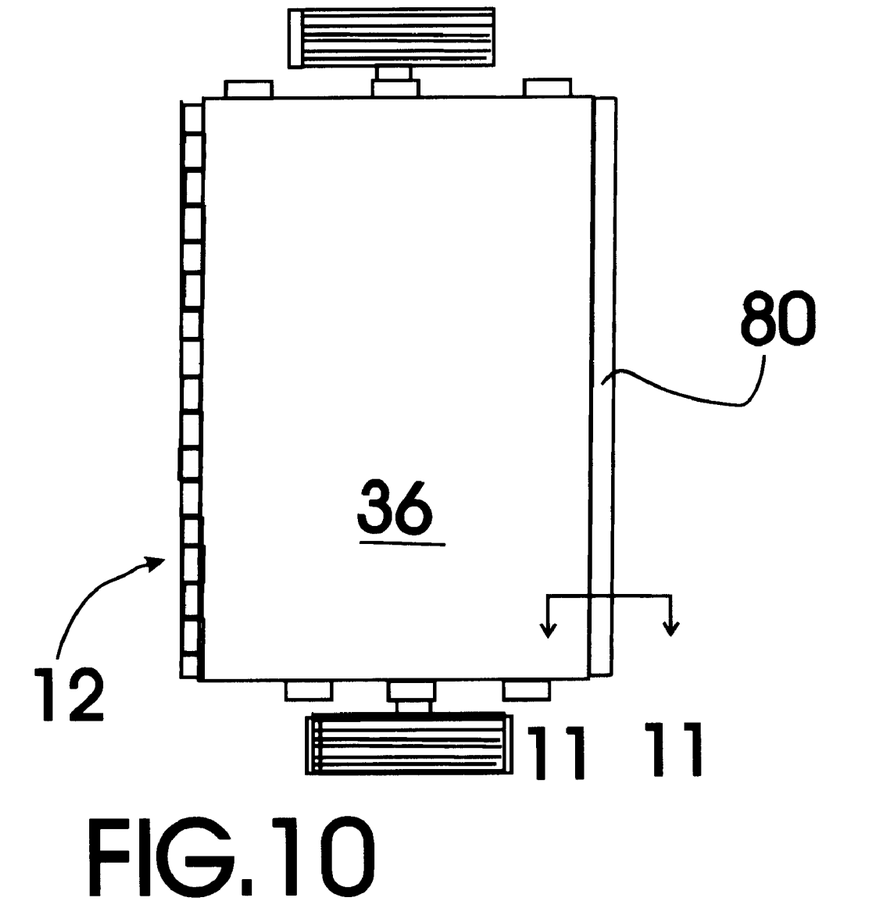
FIG. 10 is a top plan view showing the main trailer bed assembly pivotally attached to one of the bed assemblies wherein the bed assembly is oriented perpendicularly to the main bed member.
Figure 11:
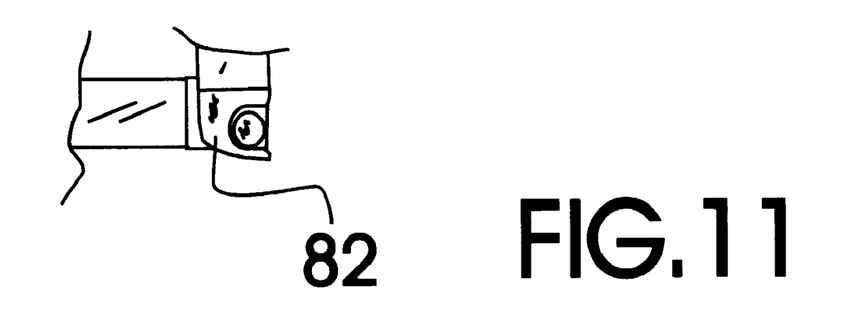
FIG. 11 is a side plan detail view showing a connecting edge structure of the main bed member including the connecting rod and one of the connecting rod support protrusions pivotally connected to one of the bed assemblies wherein sections of the connecting rod are seated within the rod receiving channels formed within the multiple rod attachment protrusions and the bed assembly is oriented perpendicularly to the main bed member.
Figure 12:
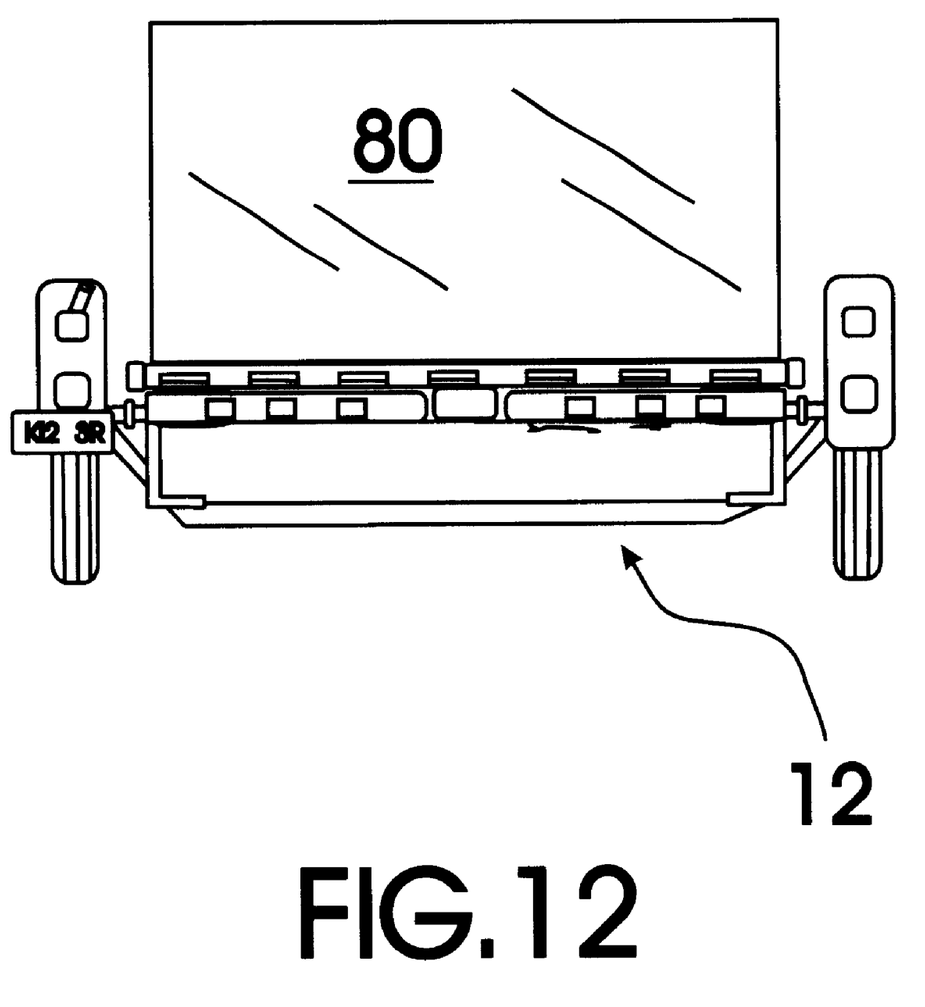
FIG. 12 is a side plan view showing one of the bed assemblies oriented perpendicularly to the main bed member.
Figure 13:
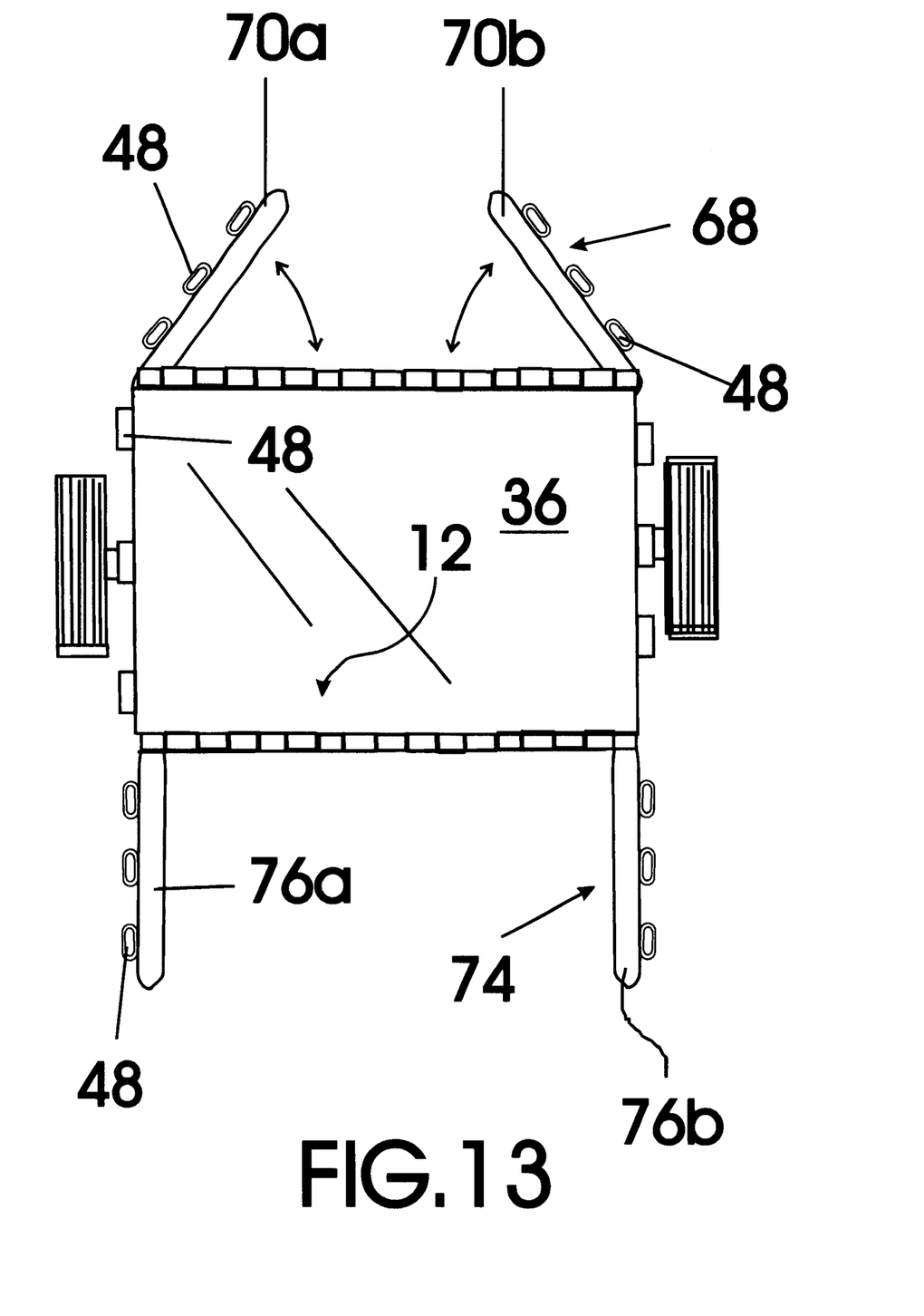
FIG. 13 is a top plan view of the main trailer bed assembly showing the pair of pivotally connected forward bed support arms partially pivoted out and the pair of back bed support arms pivoted out to the support orientation.

FIGS. 1–13 show various aspects of an exemplary embodiment of the expandable utility trailer system of the present invention generally designated 10. Expandable utility trailer system 10 includes a main trailer bed assembly, generally designated 12; a front bed assembly, generally designated 14; a back bed assembly, generally designated 16; a number of side barrier sections, each generally designated 18; a brake light/turn signal circuit, generally designated 20 including a turn signal reverse operation switch 22, and a trailer tongue assembly, generally designated 24 including a locking pin 26.

Main trailer bed assembly 12 includes a main frame structure, generally designated 28, supported by a trailer axle 30 having a wheel assembly, generally designated 32a, 32b at each end 34a, 34b, respectively; a main bed member, generally designated 36, supported on main frame structure 28 and having a front connecting edge structure, generally designated 40, adapted for pivotally connecting with the front bed assembly 14, a back connecting edge structure, generally designated 42, adapted for pivotally connecting with the back bed assembly 16 and a number of spaced barrier section connecting structures 48 on left and right main frame structure sides 50,52 thereof; a tongue assembly connecting structure, generally designated 50, having a tubular forward tongue connecting structure 52 and a tubular rear tongue connecting structure 54; a fender assembly 56 for each wheel assembly 32a, 32b that each includes a fender structure 60 having a forward facing fender surface 62, a rearward facing fender surface 64 and a user positionable brake light/turn signal lamp assembly that is attachable to either the forward facing fender surface 62 or the rearward facing fender surface 64.

Main trailer bed assembly 12 also includes a front bed support assembly, generally designated 68, that includes a pair of pivotally connected forward bed support arms 70a, 70b that pivot from the main frame structure 28 between a storage orientation (shown in FIGS. 4 and 5) that is parallel to trailer axle 30 and a support orientation that is perpendicular to the storage orientation; a back bed support assembly, generally designated 74 that includes a pair of pivotally connected back bed support arms 76a, 76b that pivot from the main frame structure 28 between a storage orientation that is parallel to the trailer axle 30 and a support orientation that is perpendicular to the storage orientation. Each bed support arm 70a, 70b, 76a, 76b includes a number of spaced barrier section connecting structures 48 provided in connection therewith.

Front and back bed assemblies 14,16 are identical in construction and include a rigid bed portion 80 having a bed portion connecting edge structure, generally designated 82, adapted for pivotally connecting with the front and the back connecting edge structures 40,42 such that the front and back bed assemblies 14,16 may each be positioned in parallel orientation with the main bed member 36, in a downward angular orientation with respect to the main bed member 36 so as to function as a ramp, and in a ninety degree vertical orientation with respect to the main bed member 36 to provide a barrier along a front or a back edge 88,90 of main bed member 36.

Tongue assembly 24 includes an elongated connecting bar 94 having a trailer hitch ball connecting assembly, generally designated 96 at one connecting bar end and a main trailer bed assembly connecting bar end 98 that is detachably securable in connection with the forward tubular tongue connecting structure 52 or the tubular rear tongue connecting structure 54 of the tongue connecting assembly 50 using a locking pin 26 that is insertable through concentrically alignable holes 100,102.

Each of the number of side barrier sections 18 has a metal mesh barrier structure 108 from which three parallel connection shafts 110 protrude. Shafts 110 are insertable into barrier section connecting structures 48 such that barrier structure 108 is supported perpendicularly to main bed member 36.

A turn signal reverse operation switch 120 is provided in the brake light/turn signal circuit 20 so that the turn indicator lights 68 operate correctly whether the tongue assembly 24 is connected to the tubular forward tongue connecting structure 52 or the tubular rear tongue connecting structure 54.

It can be seen from the preceding description that an expandable utility trailer system has been provided.

It is noted that the embodiment of the expandable utility trailer system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:
1. An expandable utility trailer system comprising:
a main trailer bed assembly;
a front bed assembly;
a back bed assembly;
a number of side barrier sections;
a brake light/turn signal circuit including a turn signal reverse operation switch; and
a trailer tongue assembly;
the main trailer bed assembly including a main frame structure supported by a trailer axle having a wheel assembly at each end, a main bed member supported on the main frame structure having a front connecting edge structure adapted for pivotally connecting with the front bed assembly, a back connecting edge structure adapted for pivotally connecting with the back bed assembly and a number of spaced barrier section connecting structures on left and right main frame structure sides thereof, a tongue assembly connecting structure having a tubular forward tongue connecting structure and a tubular rear tongue connecting structure, a fender assembly for each wheel assembly that each includes a fender structure having a forward facing fender surface and a rearward facing fender surface and a user positionable brake light/turn signal lamp assembly that are attachable to either the forward facing fender surface or the rearward facing fender surface, a front bed support assembly including a pair of pivotally connected forward bed support arms that pivot from the main frame structure between a storage orientation that is parallel to the trailer axle and a support orientation that is perpendicular to the storage orientation, a back bed support assembly including a pair of pivotally connected back bed support arms that pivot from the main frame structure between a storage orientation that is parallel to the trailer axle and a support orientation that is perpendicular to the storage orientation;

each bed support arm including a number of spaced barrier section connecting structures provided in connection therewith;

the front and back bed assemblies being identical in construction and including a rigid bed portion having a bed portion connecting edge structure adapted for pivotally connecting with the front and the back connecting edge structures such that the front and back bed assembly may each be positioned in parallel orientation with the main bed member and adapted to support a load, in a downward angular orientation with respect to the main bed member so as to function as a ramp, and in a ninety degree vertical orientation with respect to the main bed member to provide a barrier along a front or a back edge of the main bed member;

the tongue assembly including an elongated connecting bar having a trailer hitch ball connecting assembly at one connecting bar end and a main trailer bed assembly connecting bar end detachably securable in connection with the tubular forward tongue connecting structure or the tubular rear tongue connecting structure of the tongue assembly using a locking pin;

each of the number of spaced barrier sections having a barrier structure from which parallel connection shafts protrude that are insertable into barrier section connecting structures such that the barrier structure is supported perpendicularly to the main bed member;

the turn signal reverse operation switch being provided in the brake light/turn signal circuit so that the turn indicator lights operate correctly whether the tongue assembly is connected to the tubular forward tongue connecting structure or the tubular rear tongue connecting structure.

\* \* \* \* \*